United States Patent
Zhao et al.

(10) Patent No.: US 11,995,048 B2
(45) Date of Patent: May 28, 2024

(54) LIFELONG SCHEMA MATCHING

(71) Applicant: ADOBE INC., San Jose, CA (US)

(72) Inventors: Handong Zhao, San Jose, CA (US); Yikun Xian, Edison, NJ (US); Sungchul Kim, San Jose, CA (US); Tak Yeon Lee, Cupertino, CA (US); Nikhil Belsare, Foster City, CA (US); Shashi Kant Rai, Santa Clara, CA (US); Vasanthi Holtcamp, Fremont, CA (US); Thomas Jacobs, Cupertino, CA (US); Duy-Trung T Dinh, Cupertino, CA (US); Caroline Jiwon Kim, San Francisco, CA (US)

(73) Assignee: ADOBE INC., San Jose, CA (US)

( * ) Notice: Subject to any disclaimer, the term of this patent is extended or adjusted under 35 U.S.C. 154(b) by 725 days.

(21) Appl. No.: 17/036,453

(22) Filed: Sep. 29, 2020

(65) Prior Publication Data

US 2022/0100714 A1 Mar. 31, 2022

(51) Int. Cl.
*G06F 16/00* (2019.01)
*G06F 16/21* (2019.01)
(Continued)

(52) U.S. Cl.
CPC ........ *G06F 16/213* (2019.01); *G06F 18/2115* (2023.01); *G06F 18/2148* (2023.01);
(Continued)

(58) Field of Classification Search
None
See application file for complete search history.

(56) References Cited

U.S. PATENT DOCUMENTS 9,015,093 B1 * 4/2015 Commons .......... G01C 21/3602
706/26
10,223,586 B1 * 3/2019 Leibovitz ............. G06V 30/416
(Continued)

FOREIGN PATENT DOCUMENTS

WO  WO-2020109774 A1 *  6/2020  ........... G06K 9/6257

OTHER PUBLICATIONS

Lifelong learning of human actions with deep neural network self-organization, Parisi et al., (Year: 2017).*

(Continued)

*Primary Examiner* — Jean M Corrielus
(74) *Attorney, Agent, or Firm* — F. CHAU & ASSOCIATES, LLC

(57) ABSTRACT

Systems and methods for lifelong schema matching are described. The systems and methods include receiving data comprising a plurality of information categories, classifying each information category according to a schema comprising a plurality of classes, wherein the classification is performed by a neural network classifier trained based on a lifelong learning technique using a plurality of exemplar training sets, wherein each of the exemplar training sets includes a plurality of examples corresponding to one of the classes, and wherein the examples are selected based on a metric indicating how well each of the examples represents the corresponding class, and adding the data to a database based on the classification, wherein the database is organized according to the schema.

18 Claims, 7 Drawing Sheets

(51) Int. Cl.
 G06F 18/2115 (2023.01)
 G06F 18/214 (2023.01)
 G06F 18/2431 (2023.01)
 G06N 3/08 (2023.01)
 G06V 30/262 (2022.01)
(52) U.S. Cl.
 CPC ........... *G06F 18/2431* (2023.01); *G06N 3/08* (2013.01); *G06V 30/274* (2022.01)

(56) References Cited

U.S. PATENT DOCUMENTS

| | | | | |
|---|---|---|---|---|
| 10,706,329 | B2* | 7/2020 | Anushiravani | A61B 5/7267 |
| 11,481,603 | B1* | 10/2022 | Newman | G06N 3/042 |
| 11,775,812 | B2* | 10/2023 | Zhang | G06N 3/08 |
| | | | | 700/25 |
| 2002/0107840 | A1* | 8/2002 | Rishe | G06F 16/2423 |
| 2007/0127824 | A1* | 6/2007 | Luo | G06V 40/103 |
| | | | | 382/104 |
| 2016/0260024 | A1* | 9/2016 | Campos | G06Q 10/10 |
| 2017/0032285 | A1* | 2/2017 | Sharma | G06N 3/08 |
| 2017/0132526 | A1* | 5/2017 | Cohen | G06N 20/00 |
| 2018/0268298 | A1* | 9/2018 | Johansen | G06V 10/764 |
| 2018/0330729 | A1* | 11/2018 | Golipour | G10L 15/26 |
| 2020/0051252 | A1* | 2/2020 | Brown | G06F 18/214 |
| 2020/0073636 | A1* | 3/2020 | Cammarota | G06N 3/084 |
| 2020/0097757 | A1* | 3/2020 | Min | G06V 10/764 |
| 2020/0279374 | A1* | 9/2020 | King | G06V 10/50 |
| 2020/0311300 | A1* | 10/2020 | Callcut | G06N 20/00 |
| 2021/0374566 | A1* | 12/2021 | Goyal | G06N 5/04 |
| 2022/0027876 | A1* | 1/2022 | Zhou | G06N 20/00 |
| 2022/0100714 | A1* | 3/2022 | Zhao | G06V 30/274 |
| 2022/0180572 | A1* | 6/2022 | Maheshwari | G06N 3/045 |
| 2022/0207007 | A1* | 6/2022 | Solanki | G06F 16/24553 |
| 2022/0236797 | A1* | 7/2022 | Drozdov | G06V 40/161 |
| 2023/0111306 | A1* | 4/2023 | Anand | G06T 7/0014 |
| | | | | 382/128 |
| 2023/0123527 | A1* | 4/2023 | Michael | G05B 23/0221 |
| | | | | 702/183 |

OTHER PUBLICATIONS

Continual lifelong learning with neural networks_A review (Year: 2019).*
12McCloskey, et al., "Catastrophic interference in connectionist networks: The sequential learning problem", Psychology of Learning and Motivation—Advances in Research and Theory, 24(C):109-165, 1989.
13Melnik, et al., "Similarity flooding: A versatile graph matching algorithm and its application to schema matching", In Proceedings 18th International Conference on Data Engineering, pp. 117-128. IEEE, 2002.
14Rahm, et al., "A survey of approaches to automatic schema matching", the VLDB Journal, 10(4):334-350, 2001.
15Rebuffi, et al., iCaRL: Incremental classifier and representation learning. In Proceedings of the IEEE conference on Computer Vision and Pattern Recognition, pp. 2001-2010, 2017.
16Ruemmele, et al., "Evaluating approaches for supervised semantic labeling", arXiv preprint arXiv:1801.09788, 2018, 16 pages.
17Shin, et al., "Continual learning with deep generative replay", In Advances in Neural Information Processing Systems, pp. 2990-2999, 2017.
18Zenke, et al., "Continual learning through synaptic intelligence", In Proceedings of the 34th International Conference on Machine Learning—vol. 70, pp. 3987-3995. JMLR. org, 2017.
19WWT: Table queries on the World Wide Web; found on the internet at: https://www.cse.iitb.ac.in/~sunita/wwt/#data.
1Aljundi, et al., "Memory aware synapses: Learning what (not) to forget", In Proceedings of the European Conference on Computer Vision (ECCV), pp. 139-154, 2018.
2Anam, et al., "Incremental schema mapping", In Yang Sok Kim, Byeong Ho Kang, and Deborah Richards, editors, Knowledge Management and Acquisition for Smart Systems and Services—13th Pacific Rim Knowledge Acquisition Workshop, PKAW 2014, Gold Cost, Qld, Australia, Dec. 1-2, 2014. Proceedings, vol. 8863, pp. 69-83.
3Bernstein, et al., "Generic schema matching, ten years later", Proceedings of the VLDB Endowment, 4(11):695-701, 2011.
4Bernstein, et al., "Incremental schema matching", In Umeshwar Dayal, Kyu-Young Whang, David B. Lomet, Gustavo Alonso, Guy M. Lohman, Martin L. Kersten, Sang Kyun Cha, and Young-Kuk Kim, editors, Proceedings of the 32nd International Conference on Very Large Data Bases, Seoul, Korea, Sep. 12-15, 2006, pp. 1167-1170. ACM, 2006.
5Hu, et al., "VizNet: Towards a large-scale visualization learning and benchmarking repository", In Proceedings of the 2019 CHI Conference on Human Factors in Computing Systems, pp. 1-12, 2019.
6Hulsebos, et al., "Sherlock: A deep learning approach to semantic data type detection", arXiv preprint arXiv:1905.10688, 2019, 9 pages.
7Kemker, et al., "FearNet: Brain-inspired model for incremental learning", arXiv preprint arXiv:1711.10563, 2017, 16 pages.
8Kim, "Convolutional neural networks for sentence classification", arXiv preprint arXiv:1408.5882, 2014, 6 pages.
9Kirkpatrick, et al., "Overcoming catastrophic forgetting in neural networks", Proceedings of the national academy of sciences, 114(13):3521-3526, 2017.
10Li, et al., "Learning without forgetting", IEEE transactions on pattern analysis and machine intelligence, 40(12):2935-2947, 2017.
11Madhavan, et al., "Generic schema matching with cupid", In VLDB, vol. 1, pp. 49-58, 2001.

* cited by examiner

LIFELONG SCHEMA MATCHING

BACKGROUND

The following relates generally to schema matching, and more specifically to schema matching using an artificial neural network (ANN).

A database is an organized collection of data. In some cases, a database stores data in a specified format known as a schema. Schema matching refers to the process of determining whether two objects are semantically related. In some cases, schema matching is used to organize data for entry into a database. For example, a schema matching system may determine that an object (e.g., a piece of data, such as the name "John") corresponds to a particular column in a database schema (e.g., the column labeled "First Name").

However, in some cases the organization of data is unknown, or different collections of data may be organized differently. This can make it difficult to include the various collections of data in a single database. Furthermore, manually mapping one schema to another can be time consuming and expensive. Therefore, there is a need in the art for systems and methods that can efficiently identify the semantic relations among data.

SUMMARY

The present disclosure describes systems and methods for lifelong schema matching using an artificial neural network (ANN). Embodiments of the disclosure include an ANN trained using examples representing different classes of a database schema. If a new class is added to the schema, the neural network can be updated with the new training data in addition to exemplar sets representing previous classes. The exemplar sets can be selected based on which training examples are the most representative. For instance, the examples can be selected based on distance from an average of the class in an embedding space.

A method, apparatus, and non-transitory computer readable medium for lifelong schema matching are described. Embodiments of the method, apparatus, and non-transitory computer readable medium include receiving data comprising a plurality of information categories, classifying each information category according to a schema comprising a plurality of classes, wherein the classification is performed by a neural network classifier trained using a plurality of exemplar training sets, wherein each of the exemplar training sets includes a plurality of examples corresponding to one of the classes, and wherein the examples are selected based on a metric indicating how well each of the examples represents the corresponding class, and adding the data to a database based on the classification, wherein the database is organized according to the schema.

A method, apparatus, and non-transitory computer readable medium for training a neural network for lifelong schema matching are described. Embodiments of the method, apparatus, and non-transitory computer readable medium include identifying a plurality of exemplar training sets, wherein each of the exemplar training sets includes training examples corresponding to one of a plurality of classes of a schema, receiving an additional training set corresponding to an additional class of the schema, wherein the additional training set comprises a plurality of additional training examples, determining a number of examples based on a number of the classes, and the additional class, selecting a subset of each of the exemplar training sets having the determined number of examples, embedding each of the additional training examples into an embedding space, identifying a center point of the additional class in the embedding space based on the embedded additional training examples, computing a distance between each of the embedded additional training examples and the center point, selecting a subset of the additional training set having the determined number of examples, and training a neural network classifier based on the subset of each of the exemplar training sets and the subset of the additional training set.

An apparatus and method for lifelong schema matching are described. Embodiments of the apparatus and method include a feature extractor configured to generate feature vectors representing information categories in data and a neural network classifier configured to classify the information categories in the data according to a schema comprising a plurality of classes, wherein the neural network classifier is trained based on a lifelong learning technique using a plurality of exemplar training sets, and wherein each of the exemplar training sets includes a plurality of data examples selected based on a metric representing how well each of the data examples represents one of the classes.

DETAILED DESCRIPTION

Figure 1:
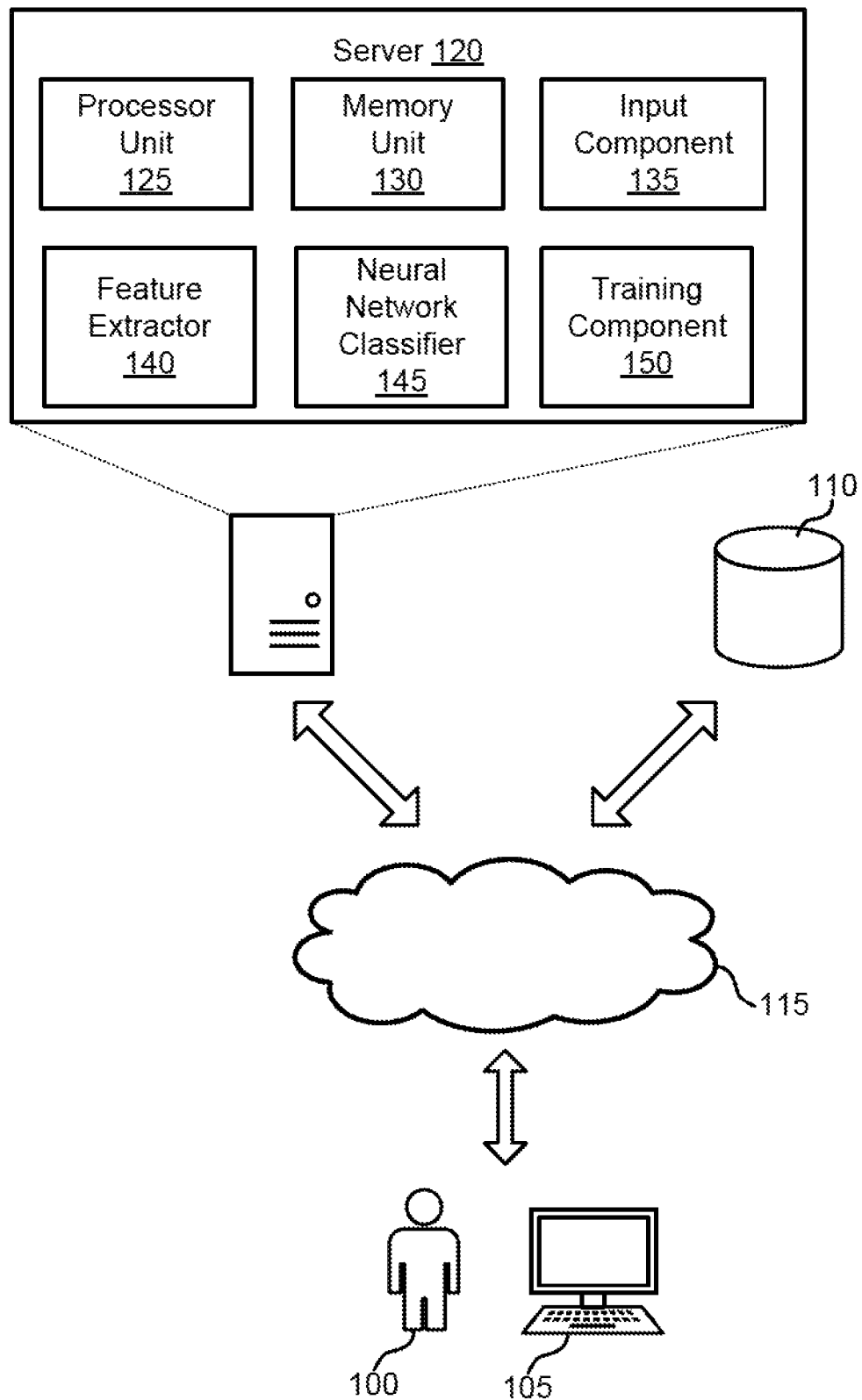
FIG. 1 shows an example of a system for lifelong schema matching according to aspects of the present disclosure.

The present disclosure describes systems and methods for lifelong schema matching using an artificial neural network (ANN). Lifelong learning may be used to update the ANN to handle new classes in the database schema. Furthermore, embodiments of the present disclosure learn to match incrementally changing schemas while taking into account restricted system memory.

Schema matching detects if two schemas are semantically related. For example, schema matching may be applied to new data to be added to a database. Rule-based methods manually create a set of rules from existing schemas. However, these methods may not be suitable for complex schema matching tasks, such as when column headers of incoming data do not match those of the existing database. Learning-based methods may also be used to automate the process of schema matching. For example, deep neural networks may perform feature extraction on tabular data and classify the data based on the extracted features. However, existing methods are not suitable when the schema is changing (i.e., where new elements of a schema are introduced into the system).

Therefore, lifelong learning may be used to continuously update a neural network for lifelong schema matching.

Lifelong learning enables a neural network to accumulate knowledge learned in the past, and use such learned knowledge in subsequent tasks. Lifelong learning models can be based on supervised learning, unsupervised learning, and reinforcement learning. One challenge associated with lifelong learning is to incorporate new knowledge (e.g., new training data) without compromising performance of previously learned tasks. For example, training a neural network on new data may cause catastrophic forgetting that undermines performance on previously learned tasks.

Furthermore, a schema matching system may have limited memory to store history data. Therefore, it may not be feasible to retain all training data for future use. Therefore, there is a need in the art for a generalizable approach for the lifelong schema matching task that reuses and adapts to different feature extraction components (i.e., a model that is agnostic to choice of feature extractor).

Accordingly, embodiments of the present disclosure provide methods for schema matching in a lifelong learning setting. Furthermore, embodiments may be trained to match additional schemas under a restricted system memory constraint. In one embodiment, each new learning task corresponds to a new dataset with new unseen schema. Either prior to, or after updating the model with the new data, a subset of the new training examples are selected and stored for future training. The examples to be stored may be selected based on a distance from an average of the training examples in an embedding space.

Therefore, unlike conventional neural network training techniques for schema classification that do not adapt to changes in the schema, the present disclosure describes at least one embodiment that incorporates new schema categories while retaining performance on existing categories. Furthermore, by selecting and storing a limited number of examples representative of each category, the lifelong learning task is accomplished even when the memory available for storing training data is limited.

For example, if an existing schema includes one or more address fields, but does not include a country field, embodiments of the present disclosure provides systems and methods for classifying data with the country field and adding it to an existing database without forgetting how to recognize other address fields.

Embodiments of the present disclosure efficiently learn from new, incremental schemas and make predictions on columns of data that represent new categories. Some examples are based on a feature-extractor-agnostic lifelong learning model that make the network model compatible with various types of data pre-processing and feature engineering modules. Therefore, embodiments of the present disclosure provide more efficient schema matching systems that can be updated with new schema elements without suffering from catastrophic forgetting.

System Overview

FIG. 1 shows an example of a system for lifelong schema matching according to aspects of the present disclosure. The example shown includes user 100, user device 105, database 110, cloud 115, and server 120. In one embodiment, server 120 includes processor unit 125, memory unit 130, input component 135, neural network classifier 145, feature extractor 140, and training component 150.

The user 100 is a user of a database 110. That is, the user 100 stores and retrieves data from the database 110 according to a schema. However, in some cases, the user 100 may wish to add data to the database 110 that does not conform to the existing schema. Therefore, the user 100 may transmit the data to the server 120 for classification. In some cases, the server 120 is trained to recognize the new data organized by updating a schema for the database and training a classifier (e.g., neural network classifier 145) to classify the new data according to the updated schema.

In some embodiments, the user 100 may communicate with the server 120 via the user device 105 and the cloud 115. When the user 100 obtains new data to be added to the database 110 that does not conform to the previous schema of the database 110, the server may classify the new data according to an updated schema and then add it to the database 110.

The user device 105 may be a personal computer, laptop computer, mainframe computer, palmtop computer, personal assistant, mobile device, or any other suitable processing apparatus.

A database 110 is an organized collection of data. For example, a database stores data in a specified format known as a schema. A database may be structured as a single database, a distributed database, multiple distributed databases, or an emergency backup database. In some cases, a database controller may manage data storage and processing in a database. In some cases, a user interacts with a database controller. In other cases, the database controller may operate automatically without user interaction. According to some embodiments, database 110 adds new data based on a neural network classifier, which classifies new data according to an existing (or an updated) schema.

Cloud 115 is a computer network configured to provide on-demand availability of computer system resources, such as data storage and computing power. In some examples, the cloud 115 provides resources without active management by the user. The term "cloud" is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, the cloud 115 is available to many organizations. In one example, cloud 115 includes a multi-layer communications network comprising multiple edge routers and core routers. In another example, cloud 115 is based on a local collection of switches in a single physical location.

Server 120 provides one or more functions to users linked by way of one or more of the various networks. In some cases, the server 120 includes a single microprocessor board, which includes a microprocessor responsible for controlling aspects of the server 120. In some cases, a server 120 uses microprocessor and protocols to exchange data with other devices/users on one or more networks via hypertext transfer protocol (HTTP), and simple mail transfer protocol (SMTP), although other protocols such as file transfer protocol (FTP), and simple network management protocol (SNMP) could also be used. In some cases, a server 120 is configured to send and receive hypertext markup language (HTML) formatted files (e.g., for displaying web pages). In various embodiments, a server 120 comprises a general purpose computing device, a personal computer, a laptop computer, a mainframe computer, a supercomputer, or any other suitable processing apparatus.

A processor unit 125 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 125 is configured to operate a memory array using a memory controller. In other cases, a memory controller is integrated into the processor unit 125. In some cases, the processor unit 125 is configured to execute computer-readable instructions stored in a memory to perform various functions. In some embodiments, a processor unit 125 includes special purpose components for modem processing, baseband processing, digital signal processing, or transmission processing.

Examples of a memory unit 130 device include random access memory (RAM), read-only memory (ROM), or a hard disk. Examples of memory devices include solid state memory and a hard disk drive. In some examples, memory unit 130 is used to store computer-readable, computer-executable software including instructions that, when executed, cause a processor to perform various functions described herein. In some cases, the memory unit 130 contains, among other things, a BIOS which controls basic hardware or software operation such as the interaction with peripheral components or devices. In some cases, a memory controller operates memory cells. For example, the memory controller can include a row decoder, column decoder, or both. In some cases, memory cells within memory unit 130 store information in the form of a logical state.

In some embodiments, the server 120 includes an artificial neural network (ANN). An ANN is a hardware or a software component that includes a number of connected nodes (as known as artificial neurons), which loosely corresponds to the neurons in a human brain. Each connection or edge transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

According to some embodiments, feature extractor 140 computes a feature vector for each information category in a set of data. Then, the neural network classifier 145 takes the feature vector as an input and outputs a schema class. In some examples, feature extractor 140 embeds each of a set of additional examples from the additional training set in an embedding space using a feature extractor 140.

According to some embodiments, feature extractor 140 is configured to generate feature vectors representing information categories in data. In some cases, feature extractor 140 embeds each of the additional training examples into an embedding space. In some examples, the feature extractor 140 includes a CNN. In some examples, the feature extractor 140 includes a Sherlock feature extractor. In some examples, the feature extractor 140 is trained along with the neural network classifier 145. In some examples, the feature extractor 140 is trained independent of the neural network classifier 145. Feature extractor 140 is an example of, or includes aspects of, the corresponding element described with reference to FIG. 3.

According to some embodiments, neural network classifier 145 classifies each information category according to a schema including a set of classes. In some cases, the neural network classifier 145 is trained based on a lifelong learning technique using a set of exemplar training sets, where each of the exemplar training sets includes a set of examples corresponding to one of the classes, and where the examples are selected based on a metric indicating how well each of the examples represents the corresponding class. In some examples, the neural network classifier 145 is trained incrementally based on a sequence of training sets, where each of the exemplar training sets is selected from at least one of the sequence of training sets.

In some examples, the neural network classifier 145 includes a batch normalization layer, a rectified linear unit (ReLU) activation function, and a softmax function. Neural network classifier 145 is an example of, or includes aspects of, the corresponding element described with reference to FIG. 3.

According to some embodiments, training component 150 trains the neural network classifier 145 based on initial training data including a set of initial classes. Then, training component 150 receives an additional training set including and additional class (e.g., where the new training data corresponds to new data to be added to the database 110). In some examples, training component 150 selects a subset of the initial training data corresponding to each of the initial classes, and a subset of the additional training set. The subset of the initial training data corresponding to each of the initial classes and the subset of the additional training set are sometimes referred to as exemplar training sets. Exemplar training sets may be selected to reduce the amount of training data that is stored and reused for future updates of the neural network classifier 145.

In some examples, training component 150 identifies a center point of an additional class based on the embedding of the feature extractor 140. Then, training component 150 computes the metric based on a distance between each of the additional examples and the center point, and the subset of the additional training set is selected based on the metric. A number of examples for each of the exemplar training sets may be selected based on the determined number of examples. In some cases, training component 150 identifies a memory size, and the number of examples is determined based on the memory size. For example, training component 150 identifies a memory size, and divides the memory size by a sum of the number of the classes and the additional class to determine the number of examples in each exemplar training set.

Accordingly, training component 150 trains the neural network classifier 145 based on the subset of each of the (previously selected) exemplar training sets and the subset of the additional training set. For example, training component 150 updates a feature extractor 140 based on the exemplar training sets and the additional training set, where the embedding of each of the additional training examples is performed using the updated feature extractor 140. In some examples, training component 150 receives a subsequent additional training set, and selects a subset of the subsequent additional training set, where the training of the neural network classifier 145 is based on the subsequent additional training set in addition to the subset of each of the exemplar training sets and the subset of the additional training set.

In some examples, training component 150 computes a cross entropy loss based on a comparison of an output of the neural network classifier 145 to class labels of the exemplar training sets and the additional training set, where the training is based on the cross entropy loss. In some examples, training component 150 computes a distillation loss based on a previous training iteration of the neural network classifier 145, where the training is based on the distillation loss.

Figure 2:
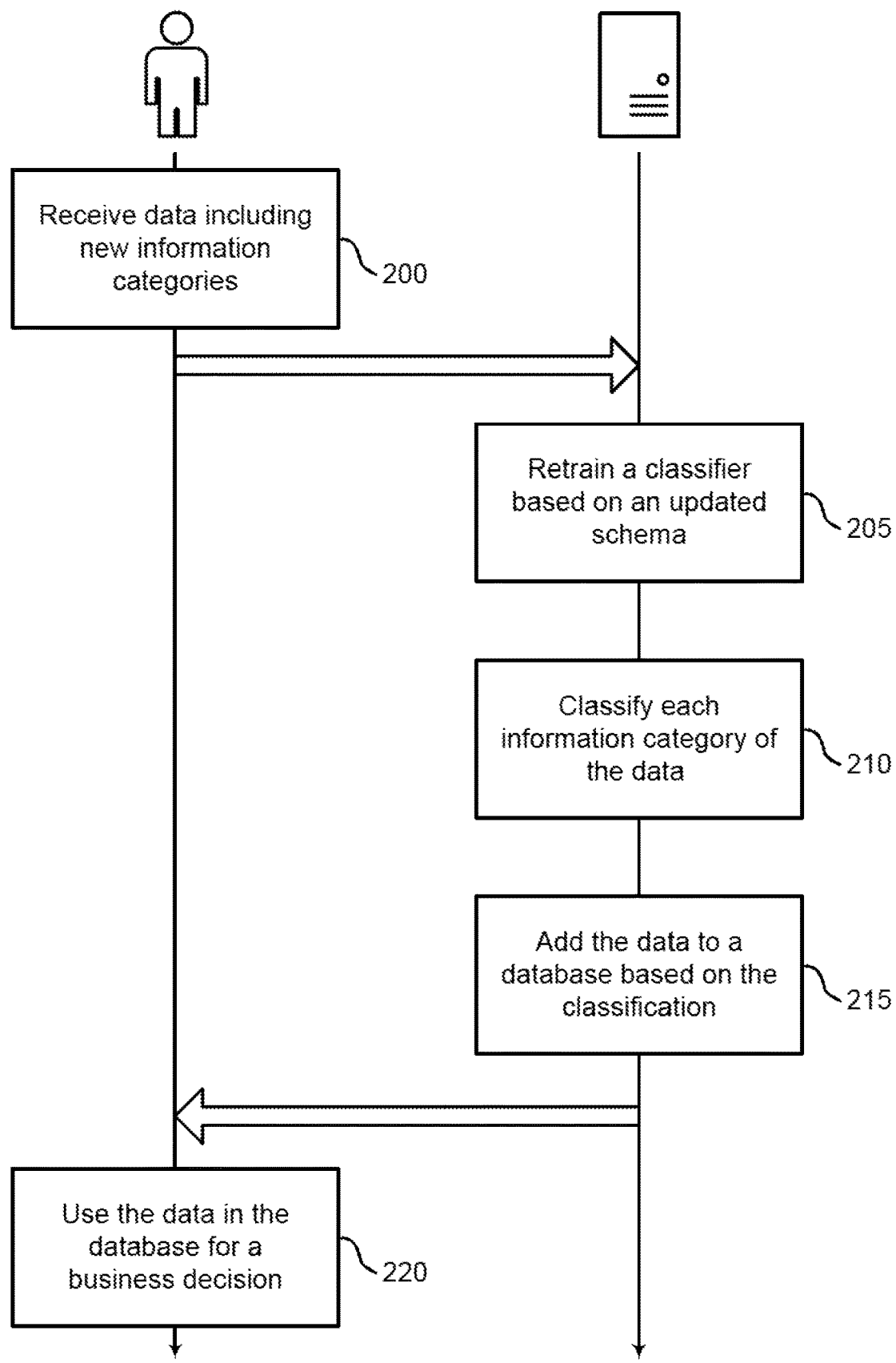
FIG. 2 shows an example of a process for adding data to a database according to aspects of the present disclosure.

FIG. 2 shows an example of a process for adding data to a database according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

FIG. 2 illustrates one example of how embodiments of the present disclosure may be used to add new data to a database when the schema of the new data includes categories that are not in the existing schema.

At operation 200, the system receives data including new information categories that do not correspond to an existing database schema. In some cases, the operations of this step refer to, or are performed by, an input component as described with reference to FIG. 1.

Schema matching may not be a static task. In practice, customer data continuously flows and evolves in a digital experience business. For example, in a data on-boarding process such as Adobe® Experience Platform (AEP), continuous customer data is matched and mapped to an Experience Data Model (XDM) to standardize customer experience data. Therefore, digital marketing businesses need to incrementally learn a schema mapper over time and accumulate knowledge learned in the past. In some cases, a server of a business entity receives data including new information categories that do not correspond to an existing database schema (e.g., new or updated customer data).

At operation 205, the system retrains a classifier based on an updated schema including the new information categories. In some cases, the operations of this step refer to, or are performed by, a training component as described with reference to FIG. 1.

For example, embodiments of the present disclosure retrain a classifier by including examples that represent categories that are new to an existing database schema using a lifelong training technique. To prevent catastrophic forgetting of previously trained categories, example data sets from the previously learned categories are stored and reused while training the classifier for the new categories. The example data sets are selected to accurately represent the existing categories while remaining within the storage limitations for the training data. For example, the example data sets may be selected as described with reference to FIG. 6 below. With proper selection of example data sets representative of each category, the classifier is updated according to an updated schema while retaining performance on previously trained tasks.

Embodiments of the present disclosure include solving a sequence of matching tasks in a lifelong learning setting with an assumption that each new task has a new dataset with new unseen schema (i.e., solving the matching task more than once). The task is referred to as a classification task. Given a sequence of datasets/schemas, the system learns a classifier in each task to classify the schema data to the correct classes.

One embodiment of the present disclosure adds new classes incrementally. In this way, the neural network classifier learns without forgetting (i.e., new task data is used to train a model while preserving original capabilities). The incremental training method includes selectively maintaining a small set of exemplars for previous tasks that are used for future training and inference.

According to an embodiment, the learning of later tasks preserves the performance of the models learned for previous tasks. Moreover, motivated by massively high data volume throughput of AEP, the server or the neural network classifier has a limited size of memory for storing history data. In addition, the neural network classifier is compatible with different data pre-processing and feature engineering modules. Therefore, a feature-extractor-agnostic lifelong learning model is provided.

According to an embodiment, columns with new schemas are incrementally added to the system by users. Then, the neural network classifier solves a sequence of tasks where each task involves a new training set with new schemas. In each task, the neural network classifier learns a function that performs well on the current task, but also not forget how to do the matching in all of previous tasks. In some cases, the neural network classifier is implemented on a server of a business entity.

At operation 210, the system classifies each information category of the data according to the updated schema. In some cases, the operations of this step refer to, or are performed by, a neural network classifier as described with reference to FIGS. 1 and 3.

Embodiments of the present disclosure adapt a lifelong learning method to the schema matching task and are capable of efficiently learning from newly incremental schemas and making predictions on unseen columns. In some cases, the neural network classifier is trained with new dataset in a later task. Thus, the neural network classifier is capable of predicting new data classes.

At operation 215, the system adds the new data to a database based on the classification. Representative sample data sets for each class of the updated schema are also saved to enable future lifelong learning tasks (e.g., when additional data is received that does not match the existing schema). In some cases, the operations of this step refer to, or are performed by, a database as described with reference to FIG. 1.

By incorporating data into the database with an updated schema, embodiments of the present disclosure enable customer data to continuously flow and evolve in a business that relies on data analytics. For example, in a data on-boarding process (e.g., for AEP), continuous customer data is matched and mapped to experience data model (XDM) to standardize customer experience data. In this way, digital marketing businesses incrementally learn a schema mapper over time and accumulate knowledge learned in the past. The system adds new customer data to the data on-boarding process or a database.

At operation 220, the system uses the data in the database for a business decision. Additionally or alternatively, the updated representative sample data are used to further update the classifier if additional data is received that includes a new class. In some cases, the operations of this step refer to, or are performed by, a user as described with reference to FIG. 1.

According to an example, continuous customer data is matched and mapped to experience data model to standardize customer experience data. A business entity (e.g., digital experience business) makes better decision based on evolving customer data.

Machine Learning Model

Figure 3:
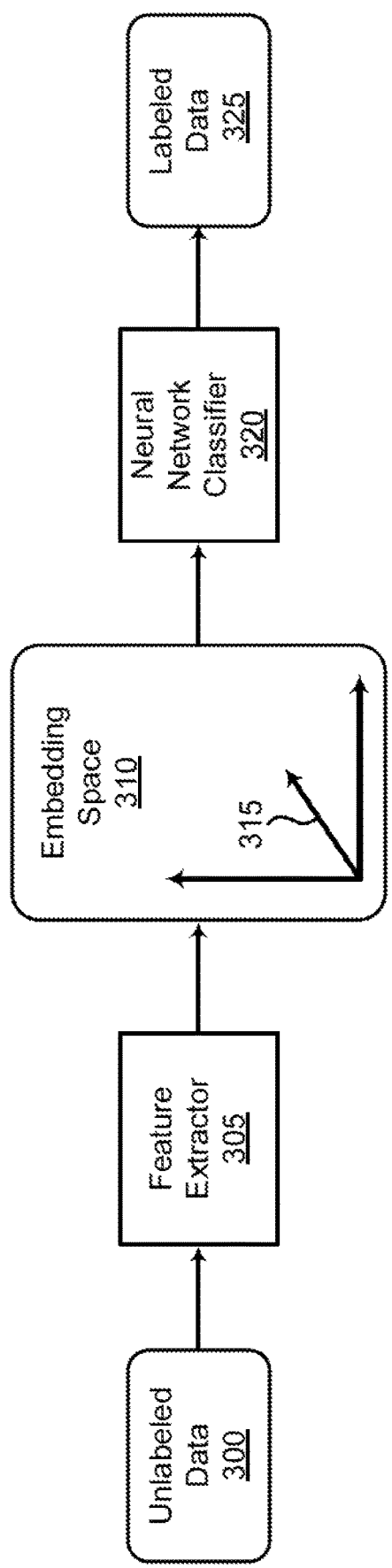
FIG. 3 shows an example of a neural network for lifelong schema matching according to aspects of the present disclosure.

FIG. 3 shows an example of a neural network for lifelong schema matching according to aspects of the present disclosure. The example shown includes unlabeled data 300, feature extractor 305, embedding space 310 (which includes feature vectors 315), neural network classifier 320, and labeled data 325.

Unlabeled data 300 may include a set of information categories. For example, the information categories may correspond to columns of data. In some cases, the columns of data have a header representing the semantic class of the column, but the header may not correspond to a class in the database schema. For example, a database schema may have a category of data called "First Name" whereas an information category may have a header called "Given Name". These categories may be semantically related, so the present disclosure provides techniques for training a classifier to match the two categories.

Feature extractor 305 converts the unlabeled data 300 into a feature vector and is an example of, or includes aspects of, the corresponding element described with reference to FIG. 1. In one example, a column x of data (e.g., in the form of a table) includes a header and a set of cells. In some cases, the header is defined to be a string (missing header corresponds to an empty string), and cells are of different data types (e.g., strings, numbers, datetimes, etc.).

According to an exemplary embodiment of the present disclosure, a CNN-based feature extractor represents the header and the set of cells as two vectors and concatenates them as an output, i.e., $x=h(x)=[x_h; x_c]$, where $x_h$ is the output header vector and $x_c$ is the output cells vector.

A CNN is a class of neural network that is commonly used in computer vision or image classification systems. In some cases, a CNN enables processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

For a column header, a CNN-based feature extractor truncates the string (representing the column header) into a sequence of words $\{w_1, \ldots, w_{|x_h|}\}$. Then, the header vector is computed as:

$$x_h = W_h \sum_j w_j \quad (1)$$

where $w_j \in \mathbb{R}^{100}$ is a low-dimensional embedding of word $w_j$, $W_h \in \mathbb{R}^{100 \times 100}$ is a parameter that embeds word averages in the latent space.

For a set of column cells, the CNN-based feature extractor randomly samples a small subset of cells and concatenates them into a string, which is made of a sequence of characters $\{z_1, \ldots, z_{|x_c|}\}$. Each character $z_j$ is embedded into a latent vector $z_j \in \mathbb{R}^{64}$. Next, through stacking all $|x_c|$ character embeddings, a matrix is obtained denoted by $Z \in \mathbb{R}^{|x_c| \times 64}$. The cells vector $x_c$ can be computed as:

$$x_c = W_c \cdot \text{maxpool}(\sigma(\text{conv}_2(\sigma(\text{conv}_1(x_c))))) \quad (2)$$

where $\text{conv}_1$ and $\text{conv}_2$ are 1D convolutional layers, $\sigma$ is an activation function ReLU, maxpool is a 1D max pooling layer and $W_c$ is a parameter matrix.

According to another embodiment of the present disclosure, a sherlock-based feature extractor 305 outputs three types of features from a set of column cells including word embedding features ($x_{word} \in \mathbb{R}^{201}$) character-level statistical features ($x_{char} \in \mathbb{R}^{960}$), and global statistical features ($x_{stats} \in \mathbb{R}^{27}$) Then, the column vector x is computed via the Sherlock feature vector $h_{sherlock}(x)$ as follows:

$$z_{word} = \sigma(W_2 \cdot \text{dropout}(\sigma(W_1 \cdot bn_1(x_{word})))) \quad (3)$$

$$z_{char} = \sigma(W_4 \cdot \text{dropout}(\sigma(W_3 \cdot bn_2(x_{char})))) \quad (4)$$

$$z_{stats} = bn_3(x_{stats}) \quad (5)$$

$$x = W_6 \cdot \text{dropout}(\sigma(W_5 \cdot bn_3([z_{word}; z_{char}; z_{stats}]))) \quad (6)$$

where $W_1, W_2, W_3, W_4, W_5$ are parameter matrices.

Thus, the feature extractor 305 may include a CNN-based feature extractor or a Sherlock-based feature extractor. Different versions of the feature extractor 305 can be seamlessly plugged into the network framework.

Neural network classifier 320 performs schema matching on the feature vectors 315 in the embedding space 310. Neural network classifier 320 is an example of, or includes aspects of, the corresponding element described with reference to FIG. 1. Schema matching can be viewed as a classification task, where a schema includes multiple classes or labels.

Thus, given a data column x, a system may first adopt a feature extractor h: $\chi \mapsto \mathbb{R}^d$ to represent the column as a d-dimensional vector denoted by $x=h(x)$ as described above. The vector x is fed to a classifier g: $\mapsto^d \mathbb{R}[0, 1]^k$ that classifies the column into one of the k classes (schemas). According to an embodiment of the present disclosure, the classifier g is a neural network.

$$g(x) = \text{softmax}(W_g \cdot \sigma(bn(x))) \quad (7)$$

where $\sigma(\cdot)$ is ReLU activation function, $bn(\cdot)$ is 1D batch normalization layer, and $W_g \in \mathbb{R}^{k \times d}$ is a learnable matrix for the classifier g. The output of the neural network classifier 320 is a set of labels, or labeled data 325.

Given the exemplar column sets $P = \{P_1, \ldots, P_n\}$ (suppose there are n classes seen so far) and a new column x, the system can predict the schema $\hat{y} \in \{1, \ldots n\}$ of x by:

$$\hat{y} = \arg\min_{y=1,\ldots,n} \|h(x; \Theta) - \mu_y\| \quad (8)$$

$$\mu_y = \frac{1}{|P_y|} \sum_{p \in P_y} h(p; \Theta), (y = 1, \ldots, n) \quad (9)$$

For efficiency, mean vector $\mu_y$ for each class y can be pre-calculated once the model is trained. For any input column x, a class y is chosen whose mean vector $\mu_y$ is the closest to $h(x;\Theta)$.

Embodiments of the present disclosure solve a sequence of tasks where each task involves a new training set with new schemas. In each task, the objective is to learn the function that performs well on the current task, but also not forget how to do matching in all of previous tasks (i.e., it does not substantially reduce performance on previous tasks).

Network Operation

Figure 4:
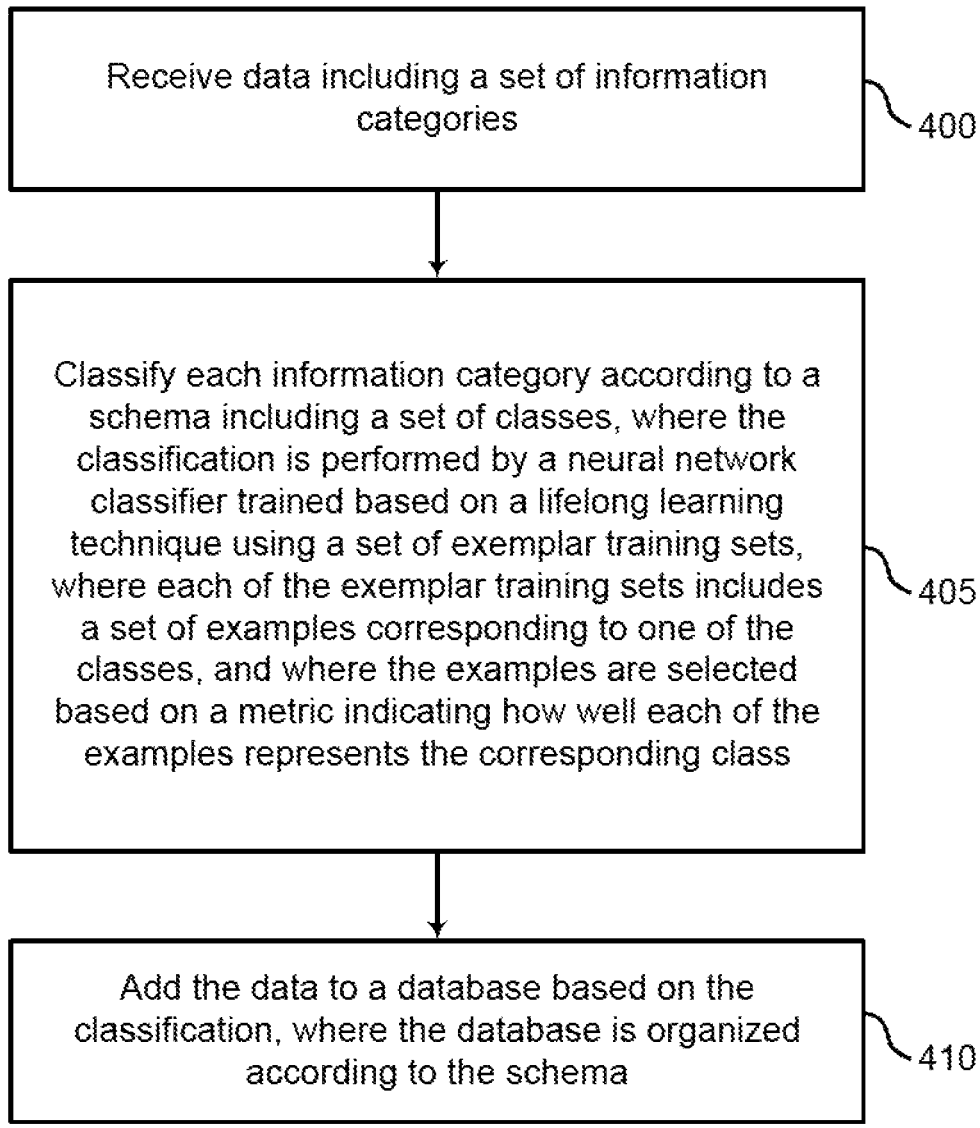
FIG. 4 shows an example of a process for lifelong schema matching according to aspects of the present disclosure.

FIG. 4 shows an example of a process for lifelong schema matching according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 400, the system receives data including a set of information categories. In some cases, the operations of this step refer to, or are performed by, an input component as described with reference to FIG. 1.

A column of data may include a header and a set of cells. According to an exemplary embodiment of the present disclosure, a CNN-based feature extractor represents the header and the set of cells into two vectors and concatenates them as an output. According to another embodiment, a sherlock-based feature extractor outputs features from a set of column cells including word embedding features, character-level statistical features, or global statistical features. Then, the column vector is computed via the Sherlock feature vector.

At operation 405, the system classifies each information category according to a schema including a set of classes, where the classification is performed by a neural network classifier trained based on a lifelong learning technique using a set of exemplar training sets, where each of the exemplar training sets includes a set of examples corresponding to one of the classes, and where the examples are selected based on a metric indicating how well each of the examples represents the corresponding class.

Accordingly, the feature vectors output from a feature extractor may be fed to a classifier that classifies the columns or categories of data into one of the schema classes. According to an embodiment of the present disclosure, the classifier is a neural network. In some cases, the operations of this step refer to, or are performed by, a neural network classifier as described with reference to FIGS. 1 and 3.

At operation 410, the system adds the data to a database based on the classification, where the database is organized according to the schema. In some cases, the operations of this step refer to, or are performed by, a database as described with reference to FIG. 1.

According to an embodiment, given a sequence of datasets including updated schemas, a system learns a classifier in each task to classify the schema data to the correct classes. The system adds the data to a database based on the classification. For example, customer data continuously flows and evolves in a digital experience business. During a data on-boarding process (e.g., AEP), continuous customer data is matched and mapped to experience data model (XDM) to standardize customer experience data. In this way, digital marketing businesses incrementally learn a schema mapper over time and accumulate knowledge learned in the past. The system adds new customer data to a database of data on-boarding process.

Lifelong Learning

Figure 5:
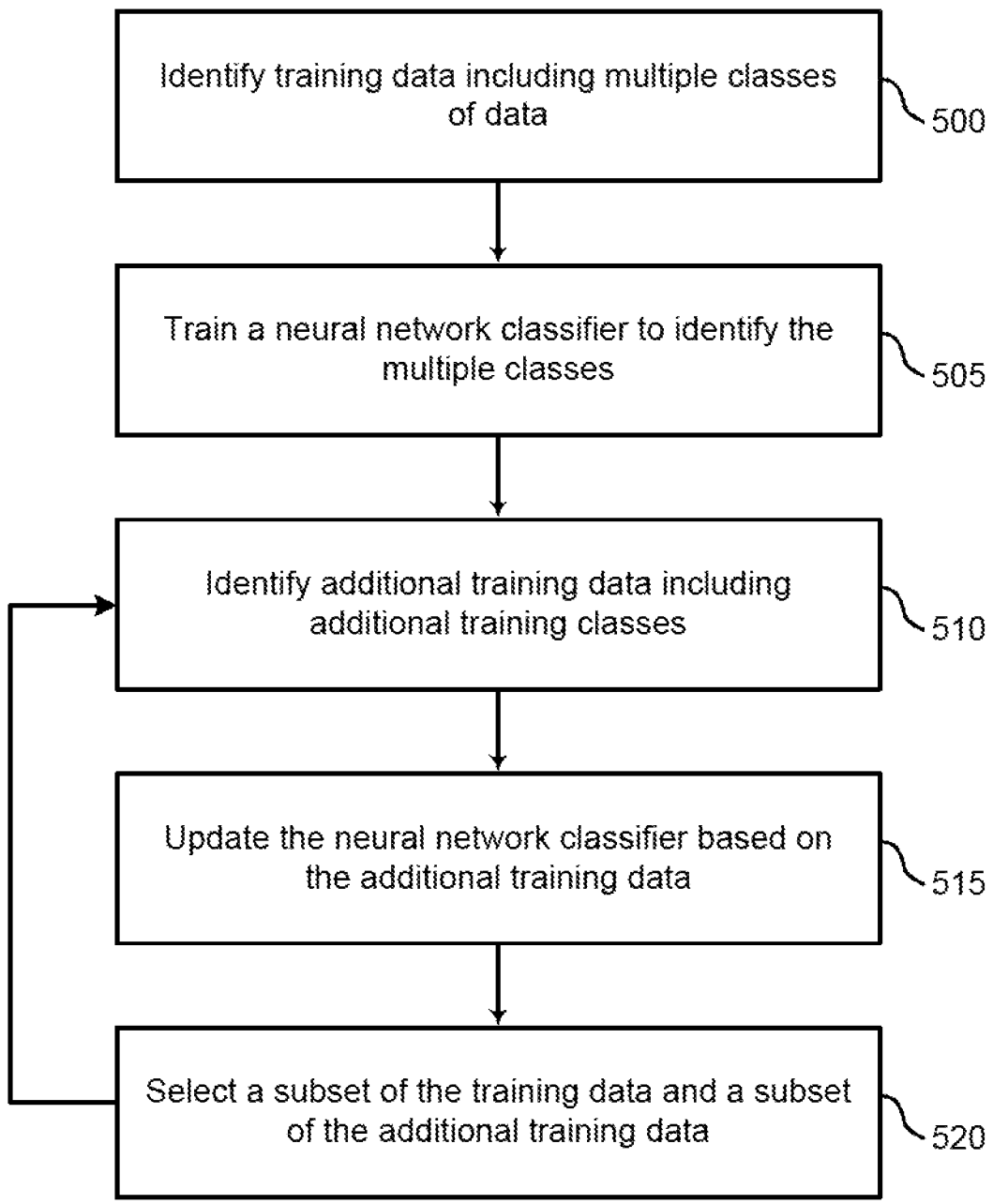
FIG. 5 shows an example of a process for training a neural network according to aspects of the present disclosure.

FIG. 5 shows an example of a process for training a neural network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

In some cases, a neural network for lifelong schema matching is trained using a supervised learning technique. Supervised learning is one of three basic machine learning paradigms, alongside unsupervised learning, and reinforcement learning. Supervised learning is a machine learning technique for learning a function that maps an input to an output based on exemplary input-output pairs. Supervised learning generates a function for predicting labeled data based on labeled training data consisting of a set of training examples.

In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances. In other words, the learning algorithm generalizes from the training data to unseen examples.

Information categories of data may include a header and a set of cells, where the header is a string, and cells are of different data types. Let $\chi$ be the universal set of columns. In some cases, each column can be uniquely mapped to a schema $y \in \mathcal{Y}$, where $\mathcal{Y}$ is a universal set of all schemas.

Thus, given a training set of column-schema pairs $D_{train}=\{(x,y)|x\in\chi, y\in\mathcal{Y}\}$, embodiments of the present disclosure learns a function $f: \chi \mapsto \mathcal{Y}$ such that the generalization error of $f$ making wrong predictions on unseen columns (from any test set $D_{test}$) is minimized. It is assumed that all schemas are seen in the training set. That is, for each $y\in\mathcal{Y}$, there exists at least one column x that $(x,y)\in D_{train}$.

Columns with new schemas can be incrementally added to the system by users. Let $\tau_i$ denote the i-th task ($1 \le i \le n$). In a lifelong schema matching task, conduct a sequence of n tasks: $\tau_1, \tau_2, \ldots, \tau_n$. In task $\tau_i$, only a disjoint subset of schemas $\mathcal{Y}^{(i)} \subset \mathcal{Y}$ is accessible, which satisfies that $\mathcal{Y}^{(i)} \cap \mathcal{Y}^{(j)}=\emptyset$, for all $j \ne i$. The training set of task $\tau_i$ is denoted by $D_{train}^{(i)}=\{(x,y)|x\in\chi, y\in\mathcal{Y}^{(i)}\}$ and the test set is denoted by $D_{test}^{(i)}=\{(x,y)|x\in\chi, y\in\mathcal{Y}^{(i)}, (x,y)\notin D_{train}\}$. The lifelong schema matching task is illustrated as follows.

For each task $\tau_i$, given a training set $D_{train}^{(i)}$, a model learns a function $f^{(i)}: \chi \mapsto \mathcal{Y}$ such that the generalization error of $f^{(i)}$ on test sets $D_{test}^{(1)}, \ldots, D_{test}^{(i)}$ is minimized. For example, the model learns n functions $f^{(1)}, \ldots, f^{(n)}$ for n tasks. For each function $f^{(i)}$, the model can do schema matching on all of previous tasks $\tau_1, \ldots, \tau_i$. To be efficient, each function $f^{(i)}$ is incrementally updated based on $f^{(i-1)}$ using the current training set $D_{train}^{(i)}$ and limited size of history training examples restricted by the system memory.

Let $\Theta$ be the learnable parameters of $f$ (from both h and g). The complete model $f$ for schema matching is the composition of classifier g and feature extractor h, i.e., $f(x;\Theta)=g \circ h(x)$. Given a training set of columns and schemas $D_{train}=\{(x,y)|x \in \chi, y \in [k]\}$, one embodiment of the present disclosure minimizes the cross entropy loss to learn the optimal $\Theta$:

$$l_{ce}(\Theta; D_{train}) = \sum_{(x,y) \in D_{train}} -\sum_{j=1}^{k} \mathbb{1}(y=j) \log f(x;\Theta)_j \quad (10)$$

where $\mathbb{1}(\cdot)$ is the indicator function, $f(x;\Theta)_j$ denotes the j-th dimension of the output of $f$.

According to an embodiment of the present disclosure, an incremental training method is provided applying a schema matching model $f(x;\Theta)$ to lifelong schema matching tasks. The network framework coupled with incremental training overcomes catastrophic forgetting and limited memory, and is feasible in the settings of lifelong schema matching tasks.

According to an embodiment, it is assumed the labels in each task are continuously numbered. That is, in the first task $\tau_1$, labels in $D_{train}^{(1)}$ and $D_{test}^{(1)}$ are numbered in $\{1, \ldots, n_1\}$. In the second task $\tau_2$, labels in $D_{train}^{(2)}$ $D_{test}^{(2)}$ are numbered in $\{n_1+1, \ldots n_2\}$, and so on. In the i-th task $\tau_i$, labels in $D_{train}^{(i)}$ and $D_{test}^{(i)}$ are numbered in $\{n_{i-1}+1, \ldots n_i\}$. In other words, $n_i$ denotes the total number of classes that are seen in the first i tasks.

Let M be the total memory size, which means that at any time, at most M columns are allowed to be saved in the system memory. Due to restricted system memory, one embodiment of the present disclosure is provided to save at most $$\frac{M}{n_i}$$

exemplar columns for each class in the first i tasks. The exemplars are selected from training set that can largely represent the characteristics of the columns with the corresponding schema, and are used in both training and inference stages. Let $P^{(i)}$ be the exemplar set for task $\tau_i$. It contains a number of $n_i$ ordered lists $P_1^{(i)}, \ldots, P_{n_i}^{(i)}$ where each list $P_y^{(i)}$ ($1 \leq y \leq n_i$) contains at most $$\frac{M}{n_i}$$

columns with label y.

For task $\tau_i$ with training set $D_{train}^{(i)}$, an incremental training algorithm for training model $f$ is provided. The incremental training algorithm takes the following as input, including new training set $D_{train}^{(i)}$, total memory size M, parameters of the previous model $f$, denoted by $\Theta^{(i-1)}$, which are trained from task $\tau_{i-1}$, and exemplar set $P^{(i-1)}$ that are constructed from task $\tau_{i-1}$. After training, new model parameters $\Theta^{(i)}$ and new exemplar set $P^{(i)}$ are obtained. Algorithm 1 below shows an incremental training algorithm for training model $f$ including two steps.

---

Algorithm 1 IncrementalTraining

1: Input: training set of the i-th task $D_{train}^{(i)}$, memory size M, model parameters from the last task $\Theta^{(i-1)}$, exemplar sets $P^{(i-1)} = \{P_1^{(i-1)}, \ldots, P_{n_{i-1}}^{(i-1)}\}$.
2: Output: new parameters $\Theta^{(i)}$, new exemplar sets $P^{(i)}$.
3: // Step 1: Update model parameters with new training set and old exemplar sets.
4: $\Theta^{(i)} \leftarrow \text{Update}(D_{train}^{(i)}, P^{(i-1)}, \Theta^{(i-1)})$.
5: // Step 2: Construct new exemplar sets.
6: $m \leftarrow M/n_i$      // $n_i$ is total number of classes seen from task 1 to i.
7: for $k = 1, \ldots, n_{i-1}$ do      //$n_{i-1}$ is total number of classes seen from task 1 to i − 1.
8:      $P_k^{(i)} \leftarrow$ first m exemplars in $P_k^{(i-1)}$.
9: for $k = n_{i-1} + 1, \ldots, n_i$ do
10:      $X_k \leftarrow \{x|(x, y) \in D_{train}^{(i)}\}$      // $X_y$ denotes the training columns whose schema is y.

11: $$\mu \leftarrow \frac{1}{|X|} \sum_{x \in X_k} h(x; \Theta^{(i)})$$

12: for $j = 1, \ldots, m$ do
13:      /*** Get m columns for each of new class while the distances of the selected columns
14:      are close to the center of all columns ***/

15: $$p_j \leftarrow \arg\min_{x \in X_k} \left\| \mu - \frac{1}{j}\left(h(x; \Theta^{(i)}) + \sum_{j'=1}^{j-1} h(p_{j'}; \Theta^{(i)})\right) \right\|_2^2$$

16: $P_k^{(i)} \leftarrow \{p_1, \ldots, p_m\}$
17: $P^{(i)} \leftarrow \{P_1^{(i)}, \ldots, P_{n_i}^{(i)}\}$
18: return $\Theta^{(i)}, P^{(i)}$ Algorithm 1. Incremental Training In the first step (line 4), the algorithm leverages $D_{train}^{(i)}$ and $P^{(i-1)}$ to update model parameters. Training the model with the new training set $D_{train}^{(i)}$ alone may lead to catastrophic forgetting, and hence not feasible. Therefore, the model is trained with a joint set of $D_{train}^{(i)}$ and $P^{(i-1)}$, denoted by $D_{joint}^{(i)} = D_{train}^{(i)} \cup U_{y \in [n_i]} \{(x,y) | x \in P_y^{i-1}, P_y^{i-1} \in P^{i-1}\}$. One embodiment of the present disclosure can minimize the classification loss, i.e., $l_{ce}(\Theta; D_{joint}^{(i)})$.

However, since the exemplar sets may be much smaller than the new training set, optimization over the classification loss alone may also worsen the schema matching performance on the previous tasks. One embodiment of the present disclosure imposes a second distillation loss $l_{distill}$ to train the model:

$$l_{distill}(\Theta^{(i)}; D_{joint}^{(i)}) = \sum_{(x,\cdot) \in D_{joint}^{(i)}} \sum_{j=1}^{n_{i-1}} BCE(f(x; \Theta^{(i-1)})_j, f(x; \Theta^{(i)})_j) \quad (11)$$

where $BCE(a,b) = -a \log b - (1-a) \log(1-b)$, the binary cross entropy function. $f(x;\Theta^{(i-1)})_j$ denotes the output of the j-th dimension from the previous model $f$ parameterized by $\Theta^{(i-1)}$. $f(x;\Theta^{(i)})_j$ denotes the output of the j-th dimension from the current model $f$ parameterized by the latest $\Theta^{(i)}$. In some cases, the parameters $\Theta^{(i-1)}$ may be fixed during training period in task $\tau_i$ while the parameters $\Theta^{(i)}$ are updated.

According to one example, the joint objective function for training $\Theta^{(i)}$ is as follows:

$$l_{joint}(\Theta^{(i)}) = l_{ce}(\Theta^{(i)}; D_{joint}^{(i)}) + \lambda l_{distill}(\Theta^{(i)}; D_{joint}^{(i)}) \quad (12)$$

where $\lambda$ is a weighting factor.

In the second step (line 6 to line 17), the algorithm constructs new exemplar sets $P^{(i)}$ from the previous exemplar set $P^{(i-1)}$ and the training set $D_{train}^{(i)}$. For each old class $y \in \{1, \ldots n_{i-1}\}$, the size of exemplar set is reduced by taking the first m columns from the previous exemplar set $P_y^{(i-1)}$ of label y (line 7 to line 8). For each new class $y \in \{n_{i-1}+1, \ldots n_i\}$, the algorithm constructs the exemplar set from the training set $D_{train}^{(i)}$ (line 9 to line 16).

Accordingly, at operation 500, the system identifies training data including multiple classes of data. In some cases, the operations of this step refer to, or are performed by, a training component as described with reference to FIG. 1.

In some cases, a data category includes a header and a set of cells, where the header is defined to be a string (missing header corresponds to an empty string), and cells are of different data types. According to some embodiments of the present disclosure, feature extractor 140 is configured to generate feature vectors representing information categories in data.

At operation 505, the system trains a neural network classifier to identify the multiple classes. In some cases, the operations of this step refer to, or are performed by, a training component as described with reference to FIG. 1.

Schema matching can be viewed as a classification task, where schemas are referred to as classes or labels. Given a column of data, the system uses a feature extractor to represent the column as a vector. The vector may be input to a classifier that classifies the column into one of the schema classes. According to an embodiment, the classifier is a neural network.

At operation 510, the system identifies additional training data including additional training classes. In some cases, the operations of this step refer to, or are performed by, a training component as described with reference to FIG. 1.

According to an exemplary embodiment of the present disclosure, an incremental training algorithm for a training model is provided. Training the model with the new training set alone may lead to catastrophic forgetting. According to an embodiment of the present disclosure, the model is trained with a joint set of training data including exemplar data sets from previous training and new data representing an update to the schema. One embodiment of the present disclosure trains a classifier by minimizing a classification loss.

At operation 515, the system updates the neural network classifier based on the additional training data. In some cases, the operations of this step refer to, or are performed by, a training component as described with reference to FIG. 1.

According to an embodiment, the incremental training algorithm takes the following as input, including a new training set, a total memory size, parameters of the previous model, which are trained from a previous task, and exemplar sets that are constructed from a previous task. After training, the new model parameters and a new exemplar set are obtained. In this way, the neural network classifier is updated based on the additional training data, but is not subject to catastrophic forgetting.

At operation 520, the system selects a subset of the training data and a subset of the additional training data. In some cases, the operations of this step refer to, or are performed by, a training component as described with reference to FIG. 1.

For example, an algorithm constructs new exemplar sets from the previous exemplar set and a new training set. For each old class, the size of exemplar set is reduced by taking a set of examples from the previous exemplar set. For each new class, examples are selected from the new training set. In this way, a subset of the training data and a subset of the additional training data are selected.

According to an embodiment, after operation 520, the system receives new data to be input into a database and returns to operation 510, where the system identifies additional training data including additional training classes.

Figure 6:
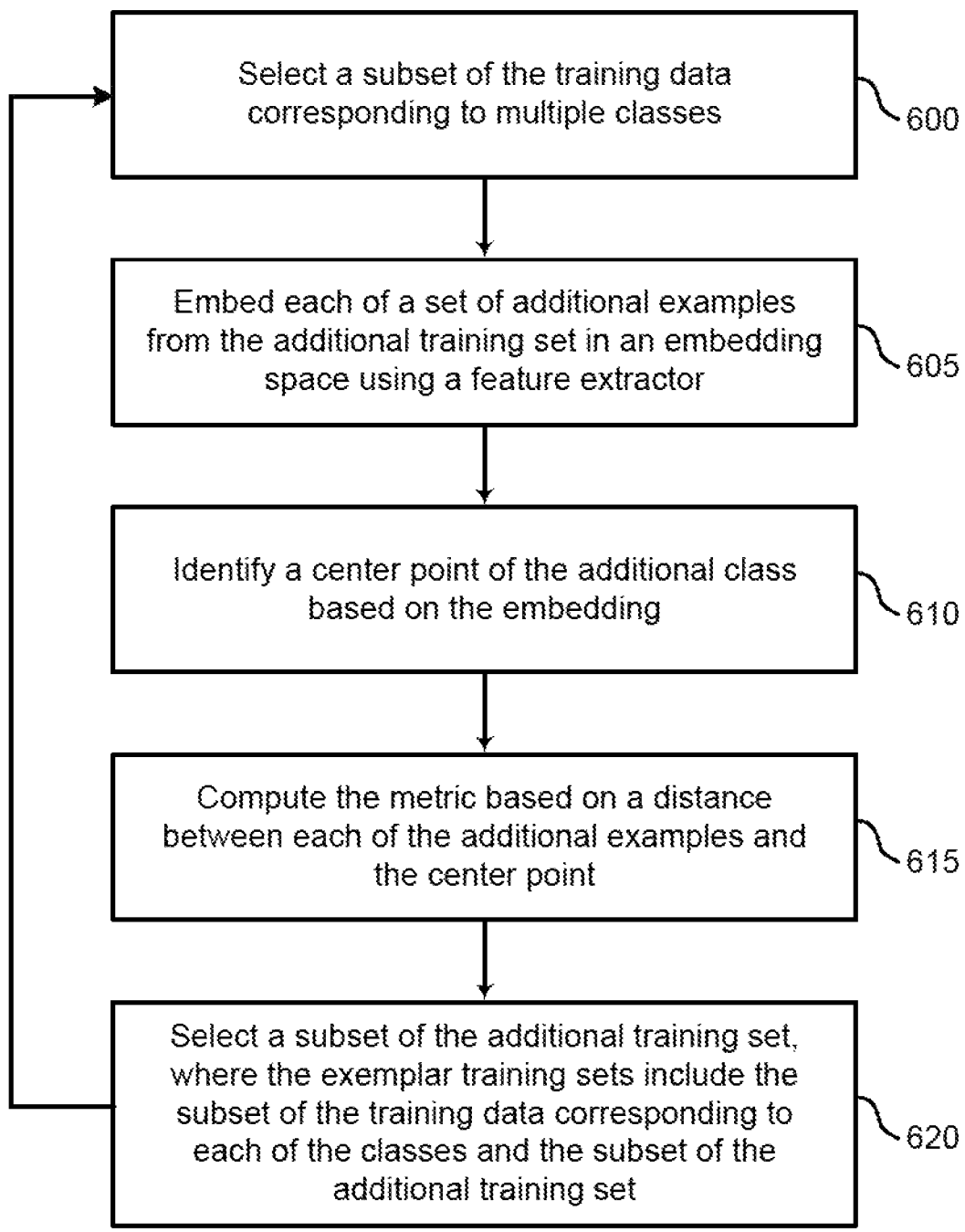
FIG. 6 shows an example of a process for selecting exemplary training data according to aspects of the present disclosure.

FIG. 6 shows an example of a process for selecting exemplary training data according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 600, the system selects a subset of the training data corresponding to multiple classes. In some cases, the operations of this step refer to, or are performed by, a training component as described with reference to FIG. 1.

In some cases, a (table) column x consists of a header and a set of cells, where the header is defined to be a string (missing header corresponds to an empty string), and cells are of different data types (e.g., string, numerics, datetime, etc.). According to some embodiments of the present disclosure, feature extractor 140 is configured to generate feature vectors representing information categories in data (i.e., training data). In this way, a subset of the training data corresponding to multiple classes is selected.

At operation 605, the system embeds each of a set of additional examples from the additional training set in an embedding space using a feature extractor. In some cases, the operations of this step refer to, or are performed by, a feature extractor as described with reference to FIGS. 1 and 3.

According to some embodiments, feature extractor 140 computes a feature vector for each of the information categories using a feature extractor 140, where the neural network classifier 145 takes the feature vector as an input. In some examples, feature extractor 140 embeds each of a set of additional examples from the additional training set in an embedding space using a feature extractor 140.

According to some embodiments, feature extractor 140 embeds each of the additional training examples into an embedding space.

According to some embodiments, feature extractor 140 is configured to generate feature vectors representing information categories in data. In some examples, the feature extractor 140 includes a CNN. In some examples, the feature extractor 140 includes a Sherlock feature extractor 140. According to one embodiment, deep neural networks (DNN) are used to extract features from schema matching.

At operation 610, the system identifies a center point of the additional class based on the embedding. In some cases, the operations of this step refer to, or are performed by, a training component as described with reference to FIG. 1. For example, for each new class, a cluster center of the new class is calculated as in algorithm 1.

At operation 615, the system computes the metric based on a distance between each of the additional examples and the center point. In some cases, the operations of this step refer to, or are performed by, a training component as described with reference to FIG. 1.

According to the example of algorithm 1, the columns for each of the new classes are obtained while the distances of the selected columns are close to the center of all columns. For example, a Euclidean distance between each of the columns of the new class to the center may be computed as in algorithm 1.

At operation 620, the system selects a subset of the additional training set, where the exemplar training sets include the subset of the training data corresponding to each of the classes and the subset of the additional training set. In some cases, the operations of this step refer to, or are performed by, a training component as described with reference to FIG. 1.

In the example of algorithm 1, new exemplar sets are constructed from the previous exemplar set and the new training set. For each old class, the size of exemplar set may be reduced by taking a set of initial columns from the previous exemplar set of the corresponding label. For each new class, examples for an exemplar set may be constructed from the training set. In this way, a subset of the additional training set is selected, and the exemplar training sets include the subset of the training data corresponding to each of the classes and the subset of the additional training set.

According to an embodiment, after operation 620, the system returns to operation 600 when new data is received, and new examples are to be selected for storage and future retraining of a neural network classifier.

Figure 7:
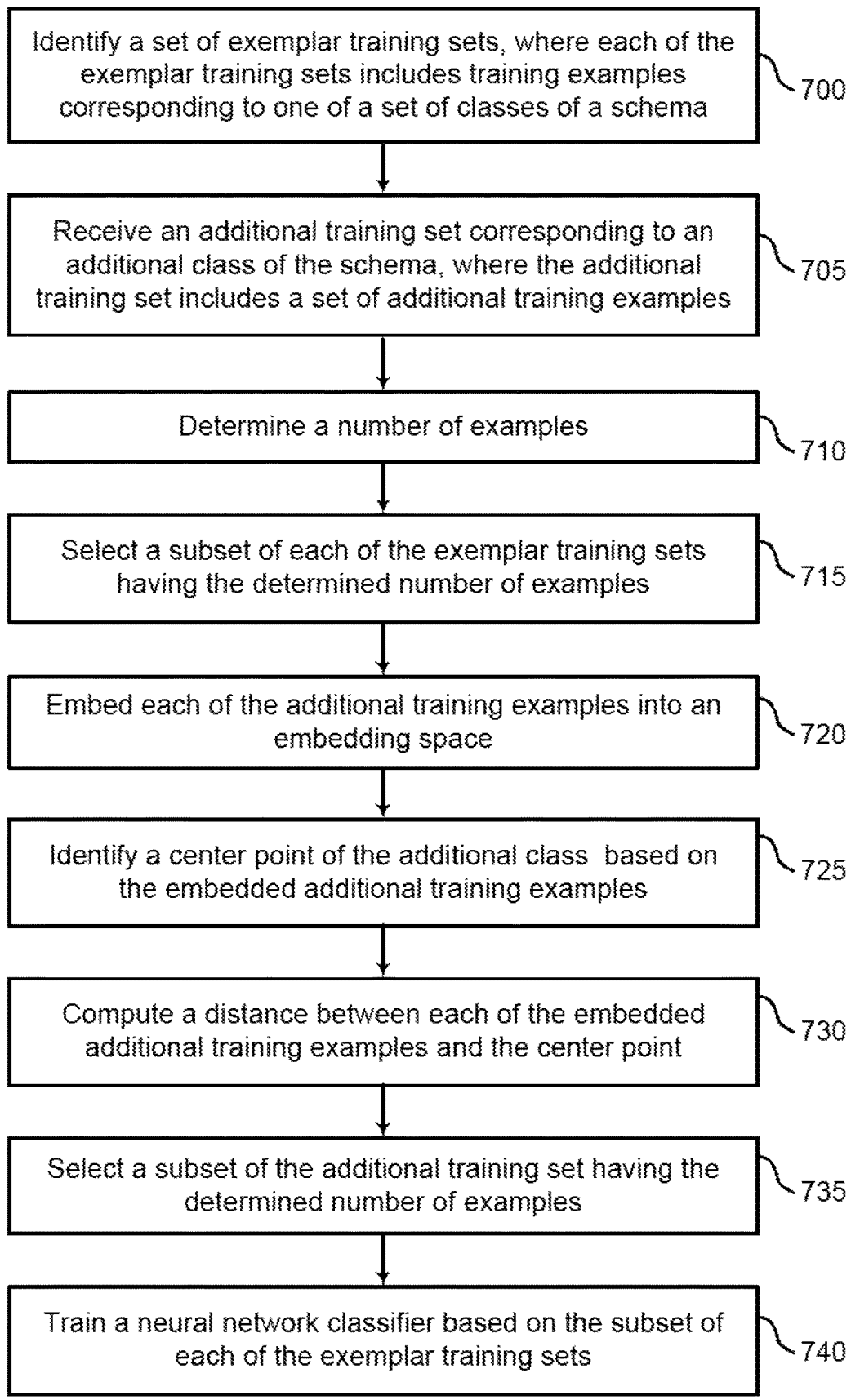
FIG. 7 shows an example of a process for training a neural network according to aspects of the present disclosure.

FIG. 7 shows an example of a process for training a neural network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 700, the system identifies a set of exemplar training sets, where each of the exemplar training sets includes training examples corresponding to one of a set of classes of a schema. In some cases, the operations of this step refer to, or are performed by, a training component as described with reference to FIG. 1. According to an embodiment of the present disclosure, an incremental training algorithm for training model is provided based on the exemplar training sets.

At operation 705, the system receives an additional training set corresponding to an additional class of the schema, where the additional training set includes a set of additional training examples. In some cases, the operations of this step refer to, or are performed by, a training component as described with reference to FIG. 1.

According to one embodiment, the incremental training algorithm takes a new training set, a total memory size, parameters of a previous model, and one or more exemplar sets constructed from previous tasks as input. After training, new model parameters and a new exemplar set are obtained. Algorithm 1 describes an example of an incremental training algorithm.

At operation 710, the system determines a number of examples based on a number of the classes, and the additional class (i.e., the new total number of classes after including a new class of data). In some cases, the operations of this step refer to, or are performed by, a training component as described with reference to FIG. 1.

At operation 715, the system selects a subset of each of the exemplar training sets having the determined number of examples. For example, the number of examples in each class may be selected by taking a total memory size (i.e., a total number of examples that may be stored) and dividing by the number of classes to be stored. In some cases, the operations of this step refer to, or are performed by, a training component as described with reference to FIG. 1.

At operation 720, the system embeds each of the additional training examples into an embedding space. For example, the examples may be embedded using a CNN-based feature extractor or a Sherlock-based feature extractor. In some cases, the operations of this step refer to, or are performed by, a feature extractor as described with reference to FIGS. 1 and 3. According to some embodiments, the feature extractor embeds each of the additional training examples into an embedding space.

According to some embodiments, the feature extractor is configured to generate feature vectors representing information categories in data. According to one embodiment, deep neural networks (DNN) are used to extract features from schema matching. According to some embodiments, a feature extractor computes a feature vector for each of the information categories, and a neural network classifier takes the feature vector as an input.

At operation 725, the system identifies a center point of the additional class in the embedding space based on the embedded additional training examples. According to one example, a cluster center of a class is calculated by taking the average position of the feature vectors for class examples in the embedding space. In some cases, the operations of this step refer to, or are performed by, a training component as described with reference to FIG. 1.

At operation 730, the system computes a distance between each of the embedded additional training examples and the center point. For example, a Euclidean distance (or another suitable distance metric) may be used to determine a distance between each training example and the center point of a cluster of examples in the embedding space. In some cases, the operations of this step refer to, or are performed by, a training component as described with reference to FIG. 1.

At operation 735, the system selects a subset of the additional training set having the determined number of examples. For example, the closest examples to the center of the cluster for the additional class may be selected based on the distance metric calculated at step 730. In some cases, the operations of this step refer to, or are performed by, a training component as described with reference to FIG. 1.

At operation 740, the system trains a neural network classifier based on the subset of each of the exemplar training sets and the subset of the additional training set. In some cases, all of the examples from an additional training set are used in training the neural network classifier initially, but future training (i.e., for subsequent classes) uses the stored exemplar training set. In some cases, the operations of this step refer to, or are performed by, a training component as described with reference to FIG. 1.

Evaluation

According to an embodiment of the present disclosure, three datasets are used for experiments, including a digital marketing dataset from Adobe® Experience Platform (AEP), an open-sourced dataset where columns only contain cells (i.e., VisNet), and another open-sourced dataset where columns contain both header and cells (WWT).

The present disclosure is compared to two baseline approaches for incremental schema matching. The baseline approaches use same feature extractors as the model but adapt different training paradigms. A retraining approach retrains a model for every task using current dataset along with all the history datasets. Retraining approach does not satisfy limited memory restriction, it is considered an upper bound of matching performance.

Finetuning approach incrementally trains a model for every task via fine-tuning technique using only the current dataset. Finetuning approach cannot guarantee the performance due to catastrophic forgetting, so it is considered a lower bound of the matching.

For each dataset, setup includes constructing 5 sequentially-organized tasks, where each task contains around $$N_y = \frac{|\mathcal{Y}|}{5}$$

classes and there is no overlapped class across any tasks. For each class, the neural network classifier and baseline models randomly sample 60% columns for training, 20% columns for validation and rest 20% for test. In the i-th task, a training set with new classes is input to each method, which then trains a schema matching model using such dataset. Then, all test sets in the first i tasks may be given separately to evaluate the test accuracy of the model.

According to an example, implementation details include fixing memory size of storing history data to be 50% of the total dataset size. In one example, models are trained for 50 epochs using an Adam optimizer with learning rate of 0.001. According to one example, the models are implemented in PyTorch.

Evaluation includes incremental schema matching performance, running time, and limited memory between the incremental training method and the baselines.

Incremental schema matching performance is evaluated between the incremental training method and the baselines. The test accuracy of incremental schema matching of present disclosure is compared to the baselines. The performance of the neural network classifier is close to an upper bound of the retraining approach, and unlike finetuning approach, the neural network classifier overcomes catastrophic forgetting.

The incremental training method and the baselines use a CNN-based feature extractor on the digital marketing dataset. Since the retraining method trains the model from scratch with all the data that have been seen, in most cases, it can achieve the highest test accuracy. The finetuning method performs well only on the latest task and forget what it has learned from previous tasks. The neural network classifier achieves comparable results to the retraining method but using much less system memory (e.g., history data).

Running time are evaluated between the incremental training method and the baselines. The training/test running time of the incremental training method and the baselines are measured. The incremental training method and the baselines use a CNN-based feature extractor. The finetuning method costs much less time in training compared to retraining method and the incremental training method. This is reasonable because finetuning uses much less training data and cannot achieve a satisfying result.

The incremental training method of the present disclosure is efficient in training compared to retrain method when the number of classes or the size of training data is very large. For example, retraining method costs slightly less time in training where there are fewer classes, the method performs well in tasks where there are more classes. The incremental training method and the baselines use comparable inference time, because they all adopt the same feature extractor which dominates the running time.

Evaluation includes different permissible system memory (i.e., limited memory) to test the matching performance of the incremental training method. In one example, experiment is conducted on a dataset with memory ratio of 0.5, 0.4, 0.3, 0.2 and 0.1, proportional to the total dataset size. A case is also considered where only one instance is saved for each class.

The results of the incremental training method using two feature extractors are illustrated. The performance of the incremental training method does not decrease significantly when memory size is reduced. When using the Sherlock-based feature extractor, the performance under different allowed memory sizes is quite comparable. In addition, even an extreme case having one exemplar column still achieves satisfying matching results. The incremental training method effectively avoids catastrophic forgetting.

Accordingly, the present disclosure at least includes the following embodiments.

A method for lifelong schema matching is described. Embodiments of the method include receiving data comprising a plurality of information categories, classifying each information category according to a schema comprising a plurality of classes, wherein the classification is performed by a neural network classifier trained based on a lifelong learning technique using a plurality of exemplar training sets, wherein each of the exemplar training sets includes a plurality of examples corresponding to one of the classes, and wherein the examples are selected based on a metric indicating how well each of the examples represents the corresponding class, and adding the data to a database based on the classification, wherein the database is organized according to the schema.

An apparatus for lifelong schema matching is described. The apparatus includes a processor, memory in electronic communication with the processor, and instructions stored in the memory. The instructions are operable to cause the processor to perform the steps of receiving data comprising a plurality of information categories, classifying each information category according to a schema comprising a plurality of classes, wherein the classification is performed by a neural network classifier trained based on a lifelong learning technique using a plurality of exemplar training sets, wherein each of the exemplar training sets includes a plurality of examples corresponding to one of the classes, and wherein the examples are selected based on a metric indicating how well each of the examples represents the corresponding class, and adding the data to a database based on the classification, wherein the database is organized according to the schema.

A non-transitory computer readable medium storing code for lifelong schema matching is described. In some examples, the code comprises instructions executable by a processor to perform the steps of receiving data comprising a plurality of information categories, classifying each information category according to a schema comprising a plurality of classes, wherein the classification is performed by a neural network classifier trained based on a lifelong learning technique using a plurality of exemplar training sets, wherein each of the exemplar training sets includes a plurality of examples corresponding to one of the classes, and wherein the examples are selected based on a metric indicating how well each of the examples represents the corresponding class, and adding the data to a database based on the classification, wherein the database is organized according to the schema.

Some examples of the method, apparatus, and non-transitory computer readable medium described above further include computing a feature vector for each of the information categories using a feature extractor, wherein the neural network classifier takes the feature vector as an input.

Some examples of the method, apparatus, and non-transitory computer readable medium described above further include training the neural network classifier incrementally based on a sequence of training sets, wherein each of the exemplar training sets is selected from at least one of the sequence of training sets.

Some examples of the method, apparatus, and non-transitory computer readable medium described above further include training the neural network classifier based on initial training data comprising a plurality of initial classes. Some examples further include receiving an additional training set comprising an additional class, wherein the classes include the initial classes and the additional class. Some examples further include selecting a subset of the initial training data corresponding to each of the initial classes. Some examples further include selecting a subset of the additional training set, wherein the exemplar training sets comprise the subset of the initial training data corresponding to each of the initial classes and the subset of the additional training set.

Some examples of the method, apparatus, and non-transitory computer readable medium described above further include embedding each of a plurality of additional examples from the additional training set in an embedding space using a feature extractor. Some examples further include identifying a center point of the additional class based on the embedding. Some examples further include computing the metric based on a distance between each of the additional examples and the center point, wherein the metric is based on the distance, wherein the subset of the additional training set is selected based on the metric.

Some examples of the method, apparatus, and non-transitory computer readable medium described above further include determining a number of examples for each of the exemplar training sets based on a number of the initial classes and the additional class, wherein the exemplar training sets are selected based on the determined number of examples.

Some examples of the method, apparatus, and non-transitory computer readable medium described above further include identifying a memory size, wherein the number of examples is determined based on the memory size.

A method for training a neural network for lifelong schema matching is described. Embodiments of the method include identifying a plurality of exemplar training sets, wherein each of the exemplar training sets includes training examples corresponding to one of a plurality of classes of a schema, receiving an additional training set corresponding to an additional class of the schema, wherein the additional training set comprises a plurality of additional training examples, determining a number of examples based on a number of the classes, and the additional class, selecting a subset of each of the exemplar training sets having the determined number of examples, embedding each of the additional training examples into an embedding space, identifying a center point of the additional class in the embedding space based on the embedded additional training examples, computing a distance between each of the embedded additional training examples and the center point, selecting a subset of the additional training set having the determined number of examples, and training a neural network classifier based on the subset of each of the exemplar training sets and the subset of the additional training set.

An apparatus for training a neural network for lifelong schema matching is described. The apparatus includes a processor, memory in electronic communication with the processor, and instructions stored in the memory. The instructions are operable to cause the processor to perform the steps of identifying a plurality of exemplar training sets, wherein each of the exemplar training sets includes training examples corresponding to one of a plurality of classes of a schema, receiving an additional training set corresponding to an additional class of the schema, wherein the additional training set comprises a plurality of additional training examples, determining a number of examples based on a number of the classes, and the additional class, selecting a subset of each of the exemplar training sets having the determined number of examples, embedding each of the additional training examples into an embedding space, identifying a center point of the additional class in the embedding space based on the embedded additional training examples, computing a distance between each of the embedded additional training examples and the center point, selecting a subset of the additional training set having the determined number of examples, and training a neural network classifier based on the subset of each of the exemplar training sets and the subset of the additional training set.

A non-transitory computer readable medium storing code for training a neural network for lifelong schema matching is described. In some examples, the code comprises instructions executable by a processor to perform the steps of identifying a plurality of exemplar training sets, wherein each of the exemplar training sets includes training examples corresponding to one of a plurality of classes of a schema, receiving an additional training set corresponding to an additional class of the schema, wherein the additional training set comprises a plurality of additional training examples, determining a number of examples based on a number of the classes, and the additional class, selecting a subset of each of the exemplar training sets having the determined number of examples, embedding each of the additional training examples into an embedding space, identifying a center point of the additional class in the embedding space based on the embedded additional training examples, computing a distance between each of the embedded additional training examples and the center point, selecting a subset of the additional training set having the determined number of examples, and training a neural network classifier based on the subset of each of the exemplar training sets and the subset of the additional training set.

Some examples of the method, apparatus, and non-transitory computer readable medium described above further include updating a feature extractor based on the exemplar training sets and the additional training set, wherein the embedding of each of the additional training examples is performed using the updated feature extractor.

Some examples of the method, apparatus, and non-transitory computer readable medium described above further include receiving a subsequent additional training set. Some examples further include selecting a subset of the subsequent additional training set, wherein the training of the neural network classifier is based on the subsequent additional training set in addition to the subset of each of the exemplar training sets and the subset of the additional training set.

Some examples of the method, apparatus, and non-transitory computer readable medium described above further include computing a sum of the embedded additional training examples. Some examples further include dividing the sum by a number of the additional training examples, wherein the center point is identified based on dividing the sum.

Some examples of the method, apparatus, and non-transitory computer readable medium described above further include computing a cross entropy loss based on a comparison of an output of the neural network classifier to class labels of the exemplar training sets and the additional training set, wherein the training is based on the cross entropy loss.

Some examples of the method, apparatus, and non-transitory computer readable medium described above further include computing a distillation loss based on a previous training iteration of the neural network classifier, wherein the training is based on the distillation loss.

Some examples of the method, apparatus, and non-transitory computer readable medium described above further include identifying a memory size. Some examples further include dividing the memory size by a sum of the number of the classes and the additional class, wherein the number of examples is determined based on the dividing.

An apparatus for lifelong schema matching is described. Embodiments of the apparatus include a feature extractor configured to generate feature vectors representing information categories in data and a neural network classifier configured to classify the information categories in the data according to a schema comprising a plurality of classes, wherein the neural network classifier is trained based on a lifelong learning technique using a plurality of exemplar training sets, and wherein each of the exemplar training sets includes a plurality of data examples selected based on a metric representing how well each of the data examples represents one of the classes.

A method of providing an apparatus for lifelong schema matching is described. The method includes providing a feature extractor configured to generate feature vectors representing information categories in data and a neural network classifier configured to classify the information categories in the data according to a schema comprising a plurality of classes, wherein the neural network classifier is trained based on a lifelong learning technique using a plurality of exemplar training sets, and wherein each of the exemplar training sets includes a plurality of data examples selected based on a metric representing how well each of the data examples represents one of the classes.

In some examples, the neural network classifier comprises a batch normalization layer, a ReLU activation function, and a softmax function. In some examples, the feature extractor comprises a CNN. In some examples, the feature extractor comprises a Sherlock feature extractor. In some examples, the feature extractor is trained along with the neural network classifier. In some examples, the feature extractor is trained independent of the neural network classifier.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for lifelong schema matching, comprising:
training a neural network classifier based on initial training data comprising a plurality of initial classes;
receiving an additional training set comprising a plurality of additional examples corresponding to an additional class;
embedding each of the plurality of additional examples from the additional training set in an embedding space;
computing a metric indicating how well each of the plurality of additional examples represents the additional class based on the embedding;
selecting a subset of the plurality of additional examples based on the metric;
determining a number of examples for each of a plurality of exemplar training sets corresponding to the plurality of initial classes;
selecting a subset of the initial training data corresponding to each of the plurality of initial classes;
creating the plurality of exemplar training sets based on the determined number of examples, wherein each of the plurality of exemplar training sets includes the subset of the initial training data corresponding to each of the plurality of initial classes, respectively;
retraining the neural network classifier based on the subset of the plurality of additional examples and the plurality of exemplar training sets;
receiving data comprising a plurality of information categories;
classifying each information category according to a schema comprising a plurality of classes, wherein the classification is performed by the neural network classifier trained using the plurality of exemplar training sets; and
adding the data to a database based on the classification, wherein the database is organized according to the schema.

2. The method of claim 1, further comprising:
computing a feature vector for each of the information categories using a feature extractor, wherein the neural network classifier takes the feature vector as an input.

3. The method of claim 1, further comprising:
training the neural network classifier incrementally based on a sequence of training sets, wherein each of the exemplar training sets is selected from at least one of the sequence of training sets.

4. The method of claim 1, further comprising:
identifying a center point of the additional class based on the embedding; and
computing the metric indicating how well each of the plurality of additional examples represents the corresponding additional class based on a distance between each of the plurality of additional examples and the center point.

5. The method of claim 1, further comprising:
identifying a memory size, wherein the number of examples is determined based on the memory size.

6. A method for training a neural network for lifelong schema matching, the method comprising:
identifying a plurality of exemplar training sets, wherein each of the exemplar training sets includes training examples corresponding to one of a plurality of classes of a schema;
receiving an additional training set corresponding to an additional class of the schema, wherein the additional training set comprises a plurality of additional training examples;
determining a number of examples based on a number of the classes, and the additional class;
selecting a subset of each of the exemplar training sets having the determined number of examples;
embedding each of the additional training examples into an embedding space;
identifying a center point of the additional class in the embedding space based on the embedded additional training examples;
computing a distance between each of the embedded additional training examples and the center point;
selecting a subset of the additional training set having the determined number of examples; and
training a neural network classifier based on the subset of each of the exemplar training sets and the subset of the additional training set.

7. The method of claim 6, further comprising:
updating a feature extractor based on the exemplar training sets and the additional training set, wherein the embedding of each of the additional training examples is performed using the updated feature extractor.

8. The method of claim 6, further comprising:
receiving a subsequent additional training set; and
selecting a subset of the subsequent additional training set, wherein the training of the neural network classifier is based on the subsequent additional training set in addition to the subset of each of the exemplar training sets and the subset of the additional training set.

9. The method of claim 6, further comprising:
computing a sum of the embedded additional training examples; and
dividing the sum by a number of the additional training examples, wherein the center point is identified based on dividing the sum.

10. The method of claim 6, further comprising:
computing a cross entropy loss based on a comparison of an output of the neural network classifier to class labels of the exemplar training sets and the additional training set, wherein the training is based on the cross entropy loss.

11. The method of claim 6, further comprising:
computing a distillation loss based on a previous training iteration of the neural network classifier, wherein the training is based on the distillation loss.

12. The method of claim 6, further comprising:
identifying a memory size; and
dividing the memory size by a sum of the number of the classes and the additional class, wherein the number of examples is determined based on the dividing.

13. An apparatus for lifelong schema matching, comprising:
a feature extractor configured to generate feature vectors representing information categories in data; and
a neural network classifier configured to classify the information categories in the data according to a schema comprising a plurality of classes, wherein the neural network classifier is trained based on a lifelong learning technique,
wherein the neural network classifier is trained by:
training the neural network classifier based on initial training data comprising a plurality of initial classes;
receiving an additional training set comprising a plurality of additional examples corresponding to an additional class;
embedding each of the plurality of additional examples from the additional training set in an embedding space;
computing a metric indicating how well each of the plurality of additional examples represents the additional class based on the embedding;
selecting a subset of the plurality of additional examples based on the metric;
determining a number of examples for each of a plurality of exemplar training sets corresponding to the plurality of initial classes;
selecting a subset of the initial training data corresponding to each of the plurality of initial classes;
creating the plurality of exemplar training sets based on the determined number of examples, wherein each of the plurality of exemplar training sets includes the subset of the initial training data corresponding to each of the plurality of initial classes, respectively; and
retraining the neural network classifier based on the subset of the plurality of additional examples and the plurality of exemplar training sets.

14. The apparatus of claim 13, wherein:
the neural network classifier comprises a batch normalization layer, a rectified linear unit (ReLU) activation function, and a softmax function.

15. The apparatus of claim 13, wherein:
the feature extractor comprises a convolutional neural network (CNN).

16. The apparatus of claim 13, wherein:
the feature extractor comprises a Sherlock feature extractor.

17. The apparatus of claim 13, wherein:
the feature extractor is trained along with the neural network classifier.

18. The apparatus of claim 13, wherein:
the feature extractor is trained independent of the neural network classifier.

* * * * *